C. O. BASTIAN.
MEANS FOR TRANSFORMING ELECTRIC ENERGY INTO HEAT.
APPLICATION FILED SEPT. 4, 1909.
1,032,267.
Patented July 9, 1912.
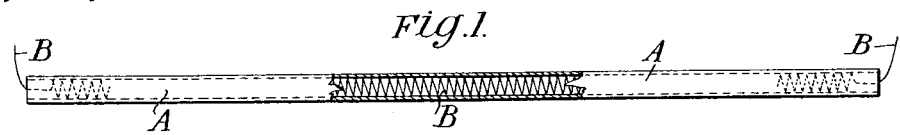
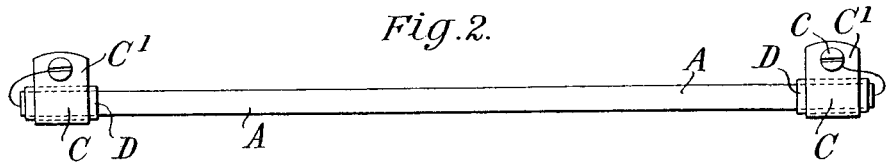
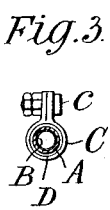
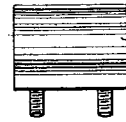
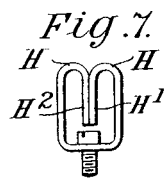
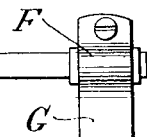
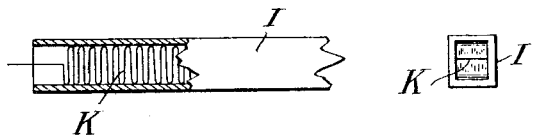

UNITED STATES PATENT OFFICE.

CHARLES ORME BASTIAN, OF LONDON, ENGLAND.

MEANS FOR TRANSFORMING ELECTRIC ENERGY INTO HEAT.

1,032,267.   Specification of Letters Patent.   Patented July 9, 1912.

Application filed September 4, 1909. Serial No. 516,284.

*To all whom it may concern:*

Be it known that I, CHARLES ORME BASTIAN, electrical engineer, a subject of the King of Great Britain, residing at 32 The Avenue, Brondesbury Park, London, England, have invented certain new and useful Improvements in Means for Transforming Electric Energy into Heat, of which the following is a specification.

This invention relates to improvements in the method and means of transforming electrical energy into heat energy or electricity into heat and has for its objects to improve the efficiency and reliability of electrical heating apparatus, and to cheapen and simplify the construction thereof and the component parts thereof and particularly those parts which may require periodic renewal.

My present invention consists in forming an electric heating element by separately combining a length of any suitable electric conductor and an inclosure or support of quartz (or equivalent material as hereinafter defined) the length of such inclosure or support being considerably less than the conducting length of the conductor with which it is combined; to achieve which the the conductor is closely arranged *e. g.* in a spiral, helical or zig-zag form.

A special feature of my present invention is the use and application of quartz ($SiO_2$) for the formation of the inclosure or support for a resistance such as herein defined and according to one method of carrying out my present invention I form the inclosure of a thin-walled quartz tube and the conductor of a closely wound nickel, silver or other suitable metal spiral, the spiral being of such a diameter as to have considerable rigidity and as to fit more or less closely the interior of the said quartz tube, and as to be easily fitted into or removed out of such quartz tube as may be desired, without its spiral formation being disarranged.

It must be understood that my invention as above described will be applicable to heating units or heating elements having inclosures or supports of compound substances other than quartz provided that such compound substances contain quartz or have substantially the same physical characteristics such as high melting point, high heat resisting quality, transparency to radiant heat, and non-liability to fracture by sudden cooling.

A further feature of my present invention consists in so combining or arranging the conductor and the aforesaid inclosure or support that the one is in surface contact with the other when at the working temperature.

A further feature of my present invention consists in reducing to the lowest practical limit the weight of material employed in the conductor and the inclosure or support as herein specified, in proportion to the capacity of the heating unit or heating element in watts transformed when the temperature of the conductor is raised above 500° C.

In order to obtain the greatest amount of heating effect by passing an electric current of a given number of amperes through a conductor of any given resistance the material, weight form and physical characteristics of the conductor and of the inclosure have to be considered as well as the medium in which it is to be immersed and the nature and quantity of the matter by which it is surrounded or supported.

In any suitable inclosure or support preferably of tubular form (hereinafter referred to as the "inclosure") I arrange a wire or wires or other suitable electrical conductor or conductors such as silver or nickel, or iron wire or silver alloy, or silver plated wire, or tantalum, gold, tungsten, copper, thorium, carbon, or silicon or compounds or mixtures, or alloys of any of these in the form of wire ribbon, or rod—other than straight; and I connect the ends of such wire or other conductor as aforesaid to leading-in connections passing through the walls or ends of the said inclosure, such leading-in connections being of lower electrical resistance, or of considerably greater cross-sectional area than the aforesaid wire or conductor in the inclosure; or the leading-in connections are otherwise arranged (*e. g.* as hereinafter described) to be maintained at a lower temperature than the wire or conductor within the said inclosure, that is, below the temperature at which they would tend to oxidize.

For the sake of brevity I will hereinafter refer to the conductor extending between the two aforesaid leading-in connections as the "resistance" whatever its form may be (other than straight) and whether it be arranged spirally or otherwise *e. g.* as aforesaid.

Terminals may be arranged on the exterior of the inclosure to enable the leading-in connections to be readily brought into contact with a suitable source of electricity, so that a current may flow through the leading-in connections to the resistance to raise the material of the resistance to the desired degree of temperature, preferably a red heat without the material of the resistance or its inclosure being chemically or injuriously acted upon (or at any rate with only a slight chemical action thereon). The resistance should be very closely arranged so as to occupy as short a length and therefore as small a weight of inclosure as possible for a given length of any given gage of wire or ribbon, etc., but care should of course be taken that adjoining convolutions or laps or surfaces of the resistance do not touch one another so as to become short circuited.

The materials employed in the construction of the stove oven or other device, such as the inclosure or supports, in which or with which the resistance or heating units are employed or arranged, are advantageously selected of a low specific heat and of as small weight and mass as possible so that the whole heating device including the resistance and envelop may be maintained at any desired heat potential with as small an expenditure of electrical energy as possible.

The best results will be obtainable with a resistance of high melting point, low specific gravity, low specific heat, and low specific resistance, and by multiplying together the constants (of certain metals) corresponding to these three latter physical characteristics some of the materials that may be used can be arranged in the following order; an order that indicates the proportion of electrical energy used up in the performance of internal work and therefore lost in overcoming molecular or atomic forces or attractions within the mass of any particular resistance as distinct from that proportion of the electrical energy that re-appears in another form capable of affecting the thermometer and is therefore available for the performance of external work, such as raising the temperature of the inclosure supports and other surrounding matter.

| Material. | Specific gravity. | Specific heat. | Specific resistance. | Product. | Fusing point, C. |
|---|---|---|---|---|---|
| Silver | 10.51 | .059 | .019 | .012 | 962 |
| Copper | 8.81 | .095 | .021 | .015 | 1083 |
| Gold | 19.5 | .032 | .027 | .017 | 1066 |
| Aluminium | 2.7 | .23 | .038 | .023 | 657 |
| Tungsten | 19.5 | .034 | .056 | .037 | 2500 |
| Zinc | 7.2 | .098 | .072 | .051 | 419 |
| Platinum | 21.0 | .031 | .117 | .079 | 1775 |
| Lead | 11.28 | .031 | .252 | .088 | 326 |
| Tantalum | 16.5 | .036 | .165 | .099 | 2250 |
| Iron | 7.2 | .120 | .125 | .107 | 1600 |
| Nickel | 8.67 | .110 | .160 | .152 | 1480 |

In other words, an inspection of the above table will show that silver at the top of said table, when raised at a high temperature, will use up electrical energy in the performance of internal work, to an extent which may be designated by .012 units. Nickel, on the other hand, will likewise consume electrical energy which may be expressed by .152 units, and the metals given between silver and nickel will consume electrical energy to the extent of the amounts indicated. But, as will appear below, other factors must be considered in selecting that resistance which commercially will possess the most advantages. For instance, carbon is not good on account of its high specific resistance while several of the metals in the foregoing table are unsuitable either on account of cost, melting point, or non-conductivity. If wolfram or tungsten could be formed into a suitable resistance it would be most efficient and tantalum could also be used with great advantage.

With due regard to cost and all the other essential conditions I have found that nickel wire is one of the most suitable materials to use and with it I may construct a commercial heating unit as follows:—I select a soft nickel wire of a diameter of .4064 millimeters; 2.7432 meters long and wind it into a close spiral on a mandrel about 1.8 millimeters in diameter. The spiral thus wound is about 180 millimeters long with the individual convolutions just separated from one another and with about 50 millimeters of wire left unwound at each end to serve as leading-in connections. This nickel spiral is then located inside a closely fitting quartz tube which should be about 200 millimeters long and about 3 millimeters bore and the walls of the tube should be as thin as possible consistent with mechanical strength as for example .75 millimeters so as to keep the weight as low as possible about 3.5 grams. Metal (preferably nickel) clips can be fitted on to the quartz tube at or near its ends on to which clips the straight ends of the spiral can be connected care being taken not to stretch the spiral in making these connections because the spiral should be so arranged as to lie or rest in the tube, without any part of it being under strain.

A heating unit constructed according to the above example may be connected across a 50 volt circuit at which potential it will take about 3 amperes, absorbing about 150 watts, and the temperature of the resistance and the tube inclosing same, will rapidly rise (in about ten seconds) to 1000° C. or thereabout, the small mass of the quartz tube having only a proportionately small cooling effect upon the resistance, so that the high temperature is rapidly attained and is efficiently maintained.

It will be obvious that I may employ other suitable metals for the resistance, for example gold or silver, and I may operate my heating units at lower temperatures; quartz has many practical advantages for the aforesaid purpose inasmuch as it can be maintained at a red heat in the atmosphere for indefinite periods without suffering any appreciable physical or chemical change, and moreover it is not damaged by cold water when red hot, it is very transparent to radiant heat, and its melting point is so high—1800° C.—that it is practically impossible to melt it or damage it by overheating. It will also be obvious that a resistance may be closely wound on the external surface of a very thin walled tube or disk of quartz if the resistance material be not readily oxidizable at the working temperatures.

I may vary the length of the heating units as desired and I may bend them into any desired form, but it is advantageous to fix or arrange them so that no draft of air will be induced through them and they are therefore preferably arranged in a horizontal position, and the access of air is further retarded by making the tube as small as possible, or by making the resistance as nearly as possible occupy all the space within the tube or inclosure as aforesaid.

In order to obtain high efficiency with any particular resistance material such as nickel, I find it advantageous to operate my apparatus so that the temperature of the resistance is raised to as near its melting point as possible although a margin of safety should be allowed, so as to minimize the chance of the resistance being melted through a rise in the voltage, such as may occur on a commercial electric supply circuit. For example I would operate a silver resistance at a temperature of about 600° C. or a nickel resistance at a temperature of about 1000° C. although these temperatures may be exceeded if the apparatus is to be operated on a circuit of exceptionally uniform voltage, however obtained.

The effect of using a finer wire or less weight or less mass of wire, is to obtain a higher temperature of equilibrium with the same expenditure of electric energy, and the advantage of this higher temperature so obtained without extra expenditure of energy is that more effective radiation is emitted from the wire than at its lower temperature.

Inasmuch as nickel is considerably cheaper than silver and its melting point (namely 1480° C.) is considerably higher than that of silver, I find it advantageous to use nickel wire as the resistance in my heating unit for most commercial purposes, but any electric conductor may be used operated at a temperature as near as practicable to the melting point of the material; or the melting point of the inclosure of quartz in which or on which it is located, provided the weight of the inclosure covering the resistance does not exceed 0.15 gram per watt and preferably and advantageously does not exceed .025 gram per watt.

It will be obvious that I may use metallic alloys or carbids or metal plated resistance material instead of pure metals, but I have found it advantageous to employ for the resistance as pure metal as possible.

Electric heating units constructed according to this invention may be connected singly, or in series, or in parallel, or partly in series and partly in parallel in any oven stove, frame, tube, or similar devices or utensil.

Referring to the accompanying drawings:—Figure 1 is a plan view of a quartz tube to form the inclosure shown full size as employed in one form of carrying my invention into practice; parts of said tube being broken away or shown in section in order to show the coiled resistance located within said tube. Fig. 2 is a view of such tube (with coiled resistance therein) showing one form of electrical contact attachment mounted on each end of said tube. Fig. 3 is an end view of Fig. 2. Fig. 4 is an edge view and Fig. 5 is a side view of a contact clip suitable for use in conjunction with the attachment shown on the tube in Fig. 2. Fig. 6 is a similar view to Fig. 2 of the tube shown in Fig. 1 with somewhat modified or different form of contact device at each end of the tube. Fig. 7 is an edge view and Fig. 8 is a side view of a contact clip suitable for use in conjunction with the attachment shown on the tube in Fig. 6. Fig. 9 is a local view partly in section (on an enlarged scale) of a quartz tube "inclosure" of rectangular form and having located within same a resistance of metal ribbon arranged in a plaited or zig-zag form. Fig. 10 is an end view of Fig. 9. Fig. 11 is a plan view of a quartz tube arranged in a circular or approximately horse-shoe shape or form with the coiled wire resistance arranged within same as in Fig. 1.

Referring now to Figs. 1 to 5:—A is a circular tube of quartz to form the inclosure shown of about the size which I have found suitable in practice viz:—the external diameter of the tube is about three-sixteenths of an inch with an internal bore or passage through the tube of a diameter of about one-eighth of an inch so that the walls of the tube are thus formed about one-thirty second of an inch thick. B is wire—advantageously nickel wire—closely coiled in the manner hereinafter described to form the resistance; this wire for example being 27 B. W. G. or thereabout. These materials and the aforesaid dimensions are given by way of example only, and the invention is in no way confined thereto. C is a metal attachment—advantageously nickel—which is provided at each end of the tube; this attachment C having a circular part adapted to fit over the sleeve or packing D of any suitable material such as asbestos, this attachment C having flattened portions C' which are adapted to be secured together by any suitable means such as by a screw or by nuts and bolts c so as to thereby secure said attachment C and its packing D firmly on each end of the quartz tube A see Figs. 2 and 3.

The whole of the device, as shown in Fig. 2, forming a complete unit—any suitable number of such units may be mounted or juxtaposed close to one another in a stove or other heating device or they may be otherwise arranged; the number of these units employed in any given device or assemblage of such units depend upon the amount of heat which it is desired to obtain and on the voltage of the circuit in which same are employed.

In Figs. 4 and 5 there is shown a convenient form of contact clip E to receive and hold therein one end of the unit (Fig. 2) this contact clip consisting merely of a U-shaped or horse-shoe shaped spring clip to which one pole of the circuit is connected.

Referring now to Figs. 6 to 8:—In Fig. 6; the tube A is shown provided with a somewhat modified form of attachment F which is mounted on the tube A with a sleeve or packing thereinbetween in a similar manner to Fig. 2 this attachment E has a downward extension or blade G adapted to enter between the contact pieces H', H², of the spring contact clip H (Figs. 7 and 8) to which latter one pole of the circuit is connected.

In Figs. 9 and 10, the quartz tube I is shown of rectangular form in cross-section; while the resistance K located within this rectangular tube I is formed of a metal ribbon which is plaited or zig-zagged so that the plaits or folds of this ribbon K lie very closely to one another, but not touching one another, this plaited or zig-zagged ribbon K practically filling up the whole interior bore of this rectangular tube I which is shown of somewhat larger size than the round tube A in Figs. 1 2 and 6.

In Fig. 11 a quartz tube A is shown (of circular cross-section) which has been bent around into circular shape to form the inclosure approximately horse-shoe shape but I do not confine myself to either this circular shape as shown in Fig. 11 or the straight form of tubes shown in the other figures of the drawings, as it will be obvious that my invention may be carried into practice with the tubes arranged in any suitable form or shape as desired. I may employ any suitable form or structure of stove or inclosing chamber in which to arrange and mount such heating units for forming a stove for cooking purposes and the like, or for forming a stove for warming purposes.

If the foregoing directions are carried into practice then a practical heating unit according to my invention will be obtained which will yield the maximum radiation between the lines A and D of the spectrum with the least possible expenditure of electric energy and such heating unit will attain its working temperature of equilibrium in the least possible time.

What I claim is:—

1. In an electric heater, the combination of a quartz covering; a continuous metallic heating resistance of greater length than said covering located inside and contacting with the same and having a melting point lower than the melting point of said covering whereby said resistance may be raised to a temperature above its glowing point without endangering said covering; and a means carried by said covering for readily connecting said resistance to and disconnecting the same from a source of current, substantially as described.

2. In an electric heater, the combination of an open ended quartz covering; and a continuous metallic heating resistance of greater length than said covering located inside the same and having a melting point lower than the melting point of said covering whereby said resistance may be raised to a temperature above its glowing point without endangering said covering, substantially as described.

3. In an electric heater, the combination of an open ended quartz covering; a continuous metallic heating resistance of greater length than said covering located inside the same and having a melting point lower than the melting point of said covering whereby said resistance may be raised to a temperature above its glowing point without endangering said covering; and means carried by said covering for connecting said resistance to a source of current, substantially as described.

4. In an electric heater, the combination of a quartz covering open at each end; a continuous spirally wound metallic heating resistance of greater length than said covering located inside and contacting with the same and having a melting point lower than the melting point of said covering whereby said resistance may be raised to a temperature above its glowing point without endangering said covering; and means carried by each end of said resistance for readily connecting to and disconnecting from a source of current, substantially as described.

In witness whereof I have hereunto set my hand in presence of two witnesses.

CHARLES ORME BASTIAN.

Witnesses:
EDWIN GANDER,
H. D. JAMESON.

Copies of this patent may be obtained for five cents each, by addressing the "Commissioner of Patents, Washington, D. C."